US006904678B2

(12) United States Patent
Silverbrook

(10) Patent No.: US 6,904,678 B2
(45) Date of Patent: Jun. 14, 2005

(54) METHOD OF MANUFACTURING A PRINTHEAD ASSEMBLY HAVING PRINTHEAD MODULES IN A CHANNEL

(75) Inventor: Kia Silverbrook, Balmain (AU)

(73) Assignee: Silverbrook Research Pty LTD, Balmain (AU)

(*) Notice: Subject to any disclaimer, the term of this patent is extended or adjusted under 35 U.S.C. 154(b) by 439 days.

(21) Appl. No.: 10/251,885

(22) Filed: Sep. 23, 2002

(65) Prior Publication Data

US 2003/0019101 A1 Jan. 30, 2003

Related U.S. Application Data

(62) Division of application No. 10/102,698, filed on Mar. 22, 2002, now Pat. No. 6,644,781.

(30) Foreign Application Priority Data

Mar. 27, 2001 (AU) .............................................. PR3993

(51) Int. Cl.[7] .............................. B23P 17/00; B41J 2/15

(52) U.S. Cl. ....................... 29/890.1; 29/25.35; 347/40; 347/42

(58) Field of Search ............................ 29/890.1, 25.35; 347/42, 29, 40, 20, 54, 13, 65, 63

(56) References Cited

U.S. PATENT DOCUMENTS 4,528,575 A * 7/1985 Matsuda et al. .............. 347/71
5,160,945 A * 11/1992 Drake .......................... 347/42
6,062,666 A * 5/2000 Omata et al. ................. 347/12
6,234,605 B1 * 5/2001 Hilton ......................... 347/42
6,281,912 B1 * 8/2001 Silverbrook ................. 347/42

FOREIGN PATENT DOCUMENTS

JP 2000263768 9/2000
WO WO 01/66354 A1 9/2001
WO WO 01/66355 A1 9/2001

* cited by examiner

*Primary Examiner*—A. Dexter Tugbang
*Assistant Examiner*—Tai Van Nguyen

(57) ABSTRACT

A method of manufacturing a printhead assembly for an A4 pagewidth drop on demand printer includes a number of printhead modules situated along a metal channel. The metal channel is typically of a special alloy called "Invar 36". Preferably the channel is nickel plated to help match it to the coefficient of thermal expansion of silicon, being the major component of each individual printhead module. Within the manufacturing method, the channel captures the printhead modules in a precise alignment relative to each other and the similar coefficient of thermal expansion of the "Invar" channel to the silicon chips allows similar relative movement during temperature changes.

1 Claim, 19 Drawing Sheets

METHOD OF MANUFACTURING A PRINTHEAD ASSEMBLY HAVING PRINTHEAD MODULES IN A CHANNEL

This application is a Divisional of U.S. patent application Ser. No. 10/102,698, filed on Mar. 22, 2002, now U.S. Pat. No. 6,644,781 B2.

CO-PENDING APPLICATIONS

Various methods, systems and apparatus relating to the present invention are disclosed in the following co-pending applications filed by the applicant or assignee of the present invention:

Ser. Nos. 09/575,141, 09/575,125, 09/575,108, 09/575,109.

The disclosures of these co-pending applications are incorporated herein by reference.

BACKGROUND OF THE INVENTION

The following invention relates to a printhead assembly having printhead modules in a channel.

More particularly, though not exclusively, the invention relates to a printhead assembly for an A4 pagewidth drop on demand printer capable of printing up to 1600 dpi photographic quality at up to 160 pages per minute.

The overall design of a printer in which the assembly can be utilized revolves around the use of replaceable printhead modules in an array approximately 8½ inches (21 cm) long. An advantage of such a system is the ability to easily remove and replace any defective modules in a printhead array. This would eliminate having to scrap an entire printhead if only one chip is defective.

A printhead module in such a printer can be comprised of a “Memjet” chip, being a chip having mounted thereon a vast number of thermo-actuators in micro-mechanics and micro-electromechanical systems (MEMS). Such actuators might be those as disclosed in U.S. Pat. No. 6,044,646 to the present applicant, however, might be other MEMS print chips.

In a typical embodiment, eleven “Memjet” tiles can butt together in a metal channel to form a complete 8½ inch printhead assembly.

The printhead might typically have six ink chambers and be capable of printing four color process (CMYK) as well as infra-red ink and fixative. An air pump would supply filtered air though a seventh chamber to the printhead, which could be used to keep foreign particles away from its ink nozzles.

Each printhead module receives ink via an elastomeric extrusion that transfers the ink. Typically, the printhead assembly is suitable for printing A4 paper without the need for scanning movement of the printhead across the paper width.

The printheads themselves are modular, so printhead arrays can be configured to form printheads of arbitrary width.

Additionally, a second printhead assembly can be mounted on the opposite side of a paper feed path to enable double-sided high speed printing.

OBJECTS OF THE INVENTION

It is an object of the present invention to provide a printhead assembly having printhead modules in a channel.

It is a further object of the present invention to provide a printhead assembly having an array of printchips held into a channel wherein the channel has a coefficient of thermal expansion substantially the same as that of silicon from which the chip are primarily made.

It is a further object of the present invention to provide a method inserting individual printhead modules into a channel in forming a printhead assembly.

SUMMARY OF THE INVENTION

The present invention provides a printhead assembly for a pagewidth drop on demand ink jet printer, comprising:

a channel extending substantially across said pagewidth, and an array of printhead modules secured to the channel so as to extend substantially across said pagewidth.

Preferably the channel is a metallic channel having a coefficient of thermal expansion substantially identical to that of a material from which the printhead modules are primarily formed.

Preferably the material from which the printhead modules are primarily formed is silicon.

Preferably the channel consists essentially of nickel iron alloy.

Preferably the channel is nickel plated.

Preferably the channel consists essentially of “Invar 36”.

Preferably the channel is a U-channel having walls of a selected thickness and wherein the channel is nickel plated to 0.056% of said wall thickness.

Preferably an elastomeric ink delivery extrusion extends along the channel, between a floor of the channel and the printhead modules.

Preferably walls of the channel impart force on the printhead modules so as to form a seal between ink inlets on each module and outlet holes that are formed on the elastomeric ink delivery extrusion.

Preferably the printhead modules are captured in a precise alignment relative to each other.

Preferably each printhead module has an elastomeric pad on one side thereof, the pad serving to “lubricate” the printhead modules within the channel to take up thermal expansion tolerances without loss of alignment of the modules.

Preferably the channel is cold rolled, annealed and nickel plated.

Preferably the channel has cut-outs at each end to mate with snap-fittings on printhead location moldings.

The present invention further provides a method of assembling a printhead assembly for a pagewidth drop on demand ink jet printer, the method comprising the steps of:

(a) providing a channel to extend substantially across said pagewidth, the channel having a pair of opposed sidewalls and a base from which the sidewalls extend, (b) applying a force to flex the sidewalls of the channel apart at a location along the channel where a printhead module is to be installed into the channel, (c) placing a printhead module into the channel at said location, (d) releasing the force such that the printhead module is retained by the walls of the channel, (e) repeating steps (b) to (d) at consecutive locations spaced along the channel until all modules of the assembly have been installed in the channel.

As used herein, the term “ink” is intended to mean any fluid which flows through the printhead to be delivered to print media. The fluid may be one of many different colored inks, infra-red ink, a fixative or the like.

BRIEF DESCRIPTION OF THE DRAWINGS

A preferred form of the present invention will now be described by way of example with reference to the accompanying drawings wherein.

DETAILED DESCRIPTION OF THE INVENTION

Figure 1:
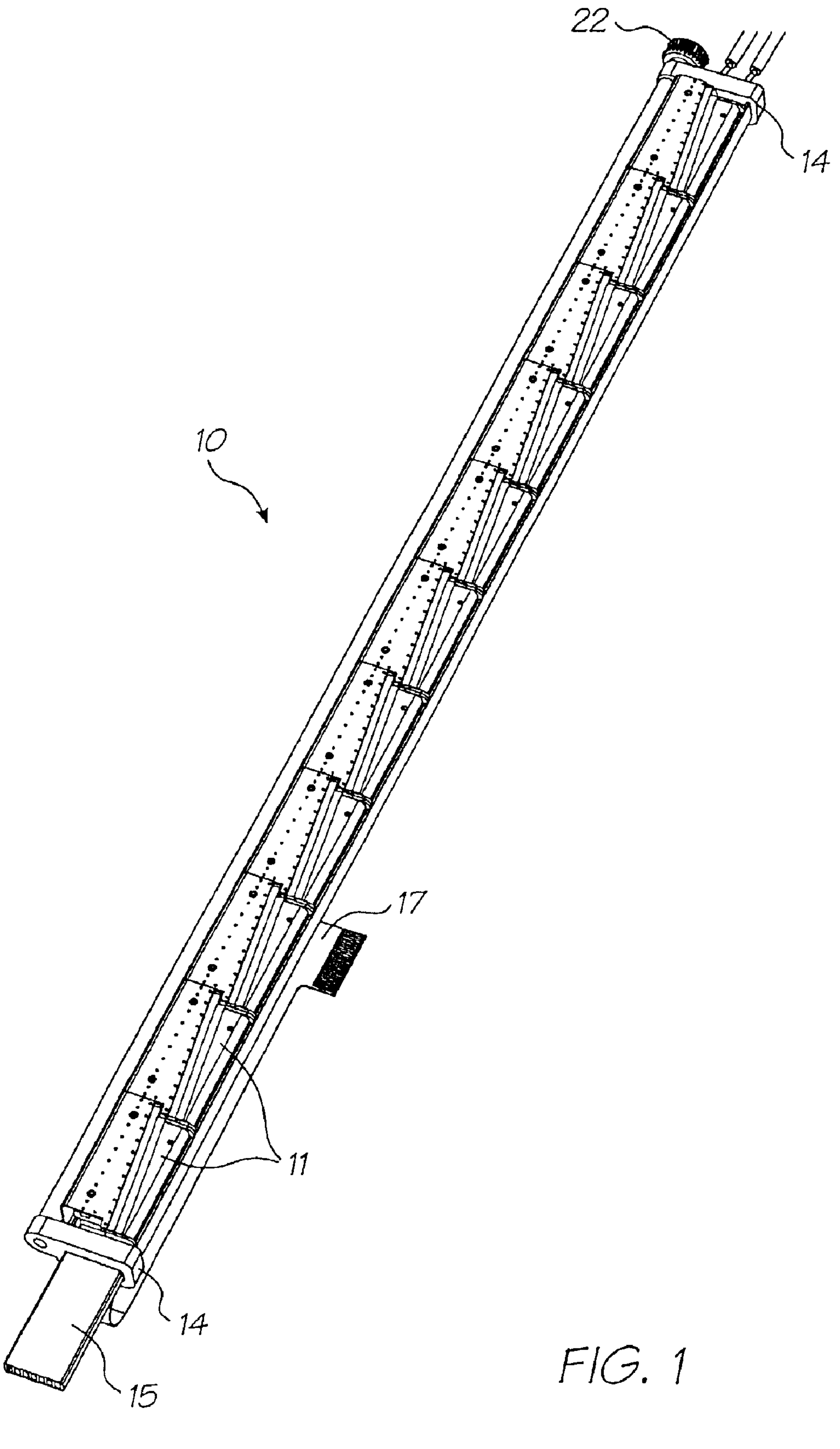
FIG. 1 is a schematic overall view of a printhead.
Figure 2:
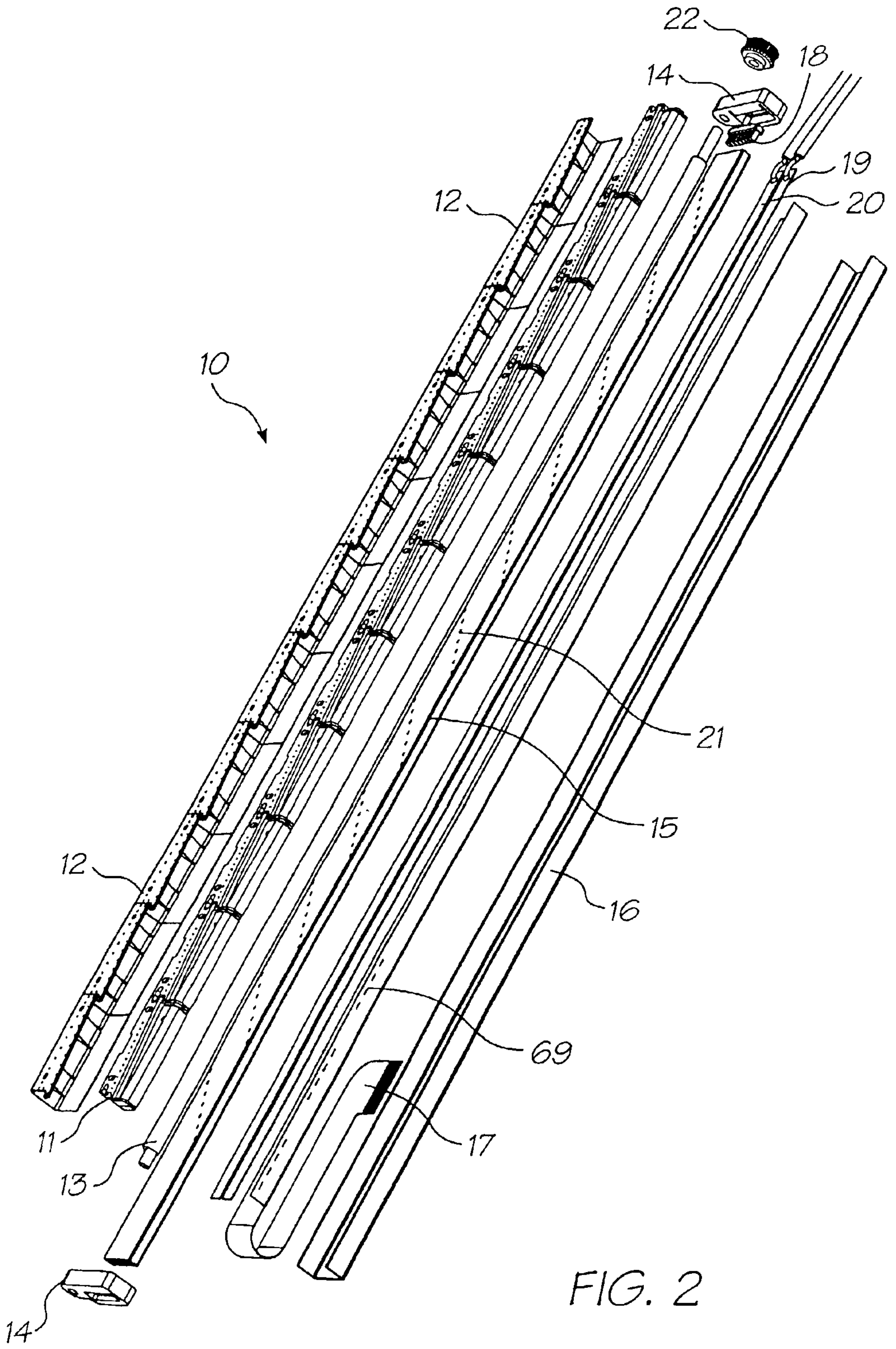
FIG. 2 is a schematic exploded view of the printhead of FIG. 1.
Figure 3:
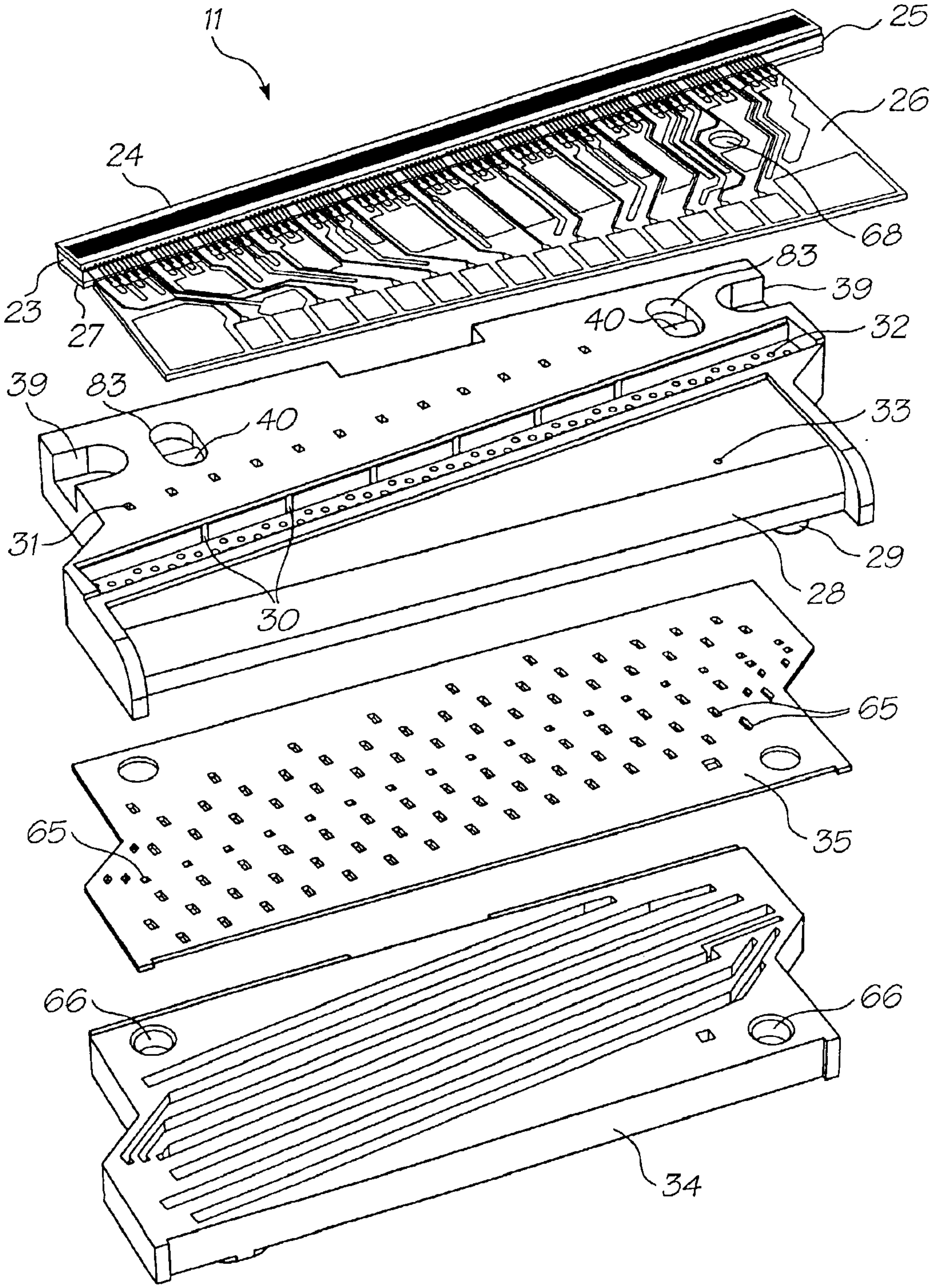
FIG. 3 is a schematic exploded view of an ink jet module.

In FIG. 1 of the accompanying drawings there is schematically depicted an overall view of a printhead assembly. FIG. 2 shows the core components of the assembly in an exploded configuration. The printhead assembly 10 of the preferred embodiment comprises eleven printhead modules 11 situated along a metal "Invar" channel 16. At the heart of each printhead module 11 is a "Memjet" chip 23 (FIG. 3). The particular chip chosen in the preferred embodiment being a six-color configuration.

Figure 3A:
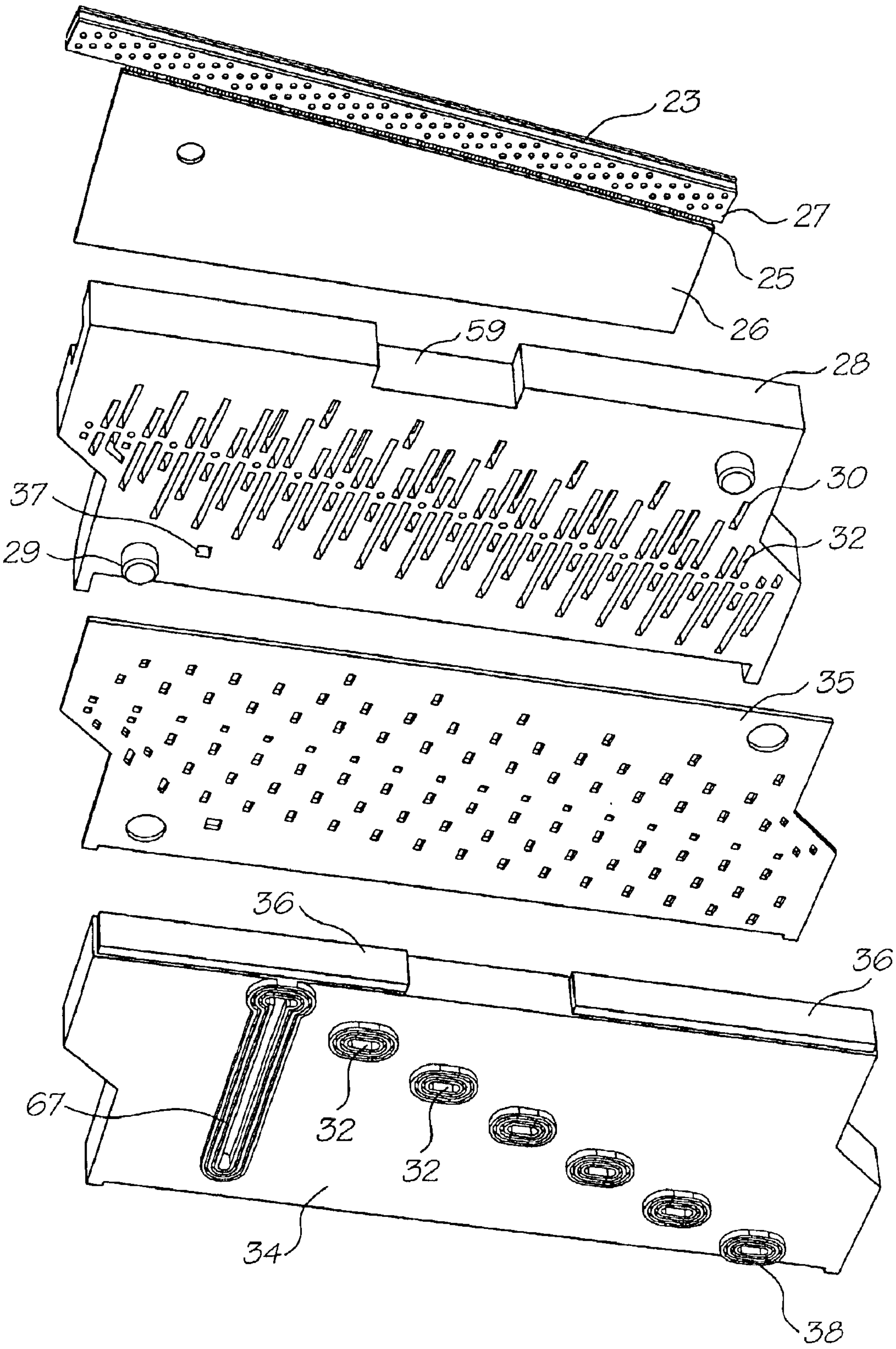
FIG. 3*a* is a schematic exploded inverted illustration of the ink jet module of FIG. 3.

The "Memjet" printhead modules 11 are comprised of the "Memjet" chip 23, a fine pitch flex PCB 26 and two micro-moldings 28 and 34 sandwiching a mid-package film 35. Each module 11 forms a sealed unit with independent ink chambers 63 (FIG. 9) which feed the chip 23. The modules 11 plug directly onto a flexible elastomeric extrusion 15 which carries air, ink and fixitive. The upper surface of the extrusion 15 has repeated patterns of holes 21 which align with ink inlets 32 (FIG. 3*a*) on the underside of each module 11. The extrusion 15 is bonded onto a flex PCB (flexible printed circuit board).

Figure 9:
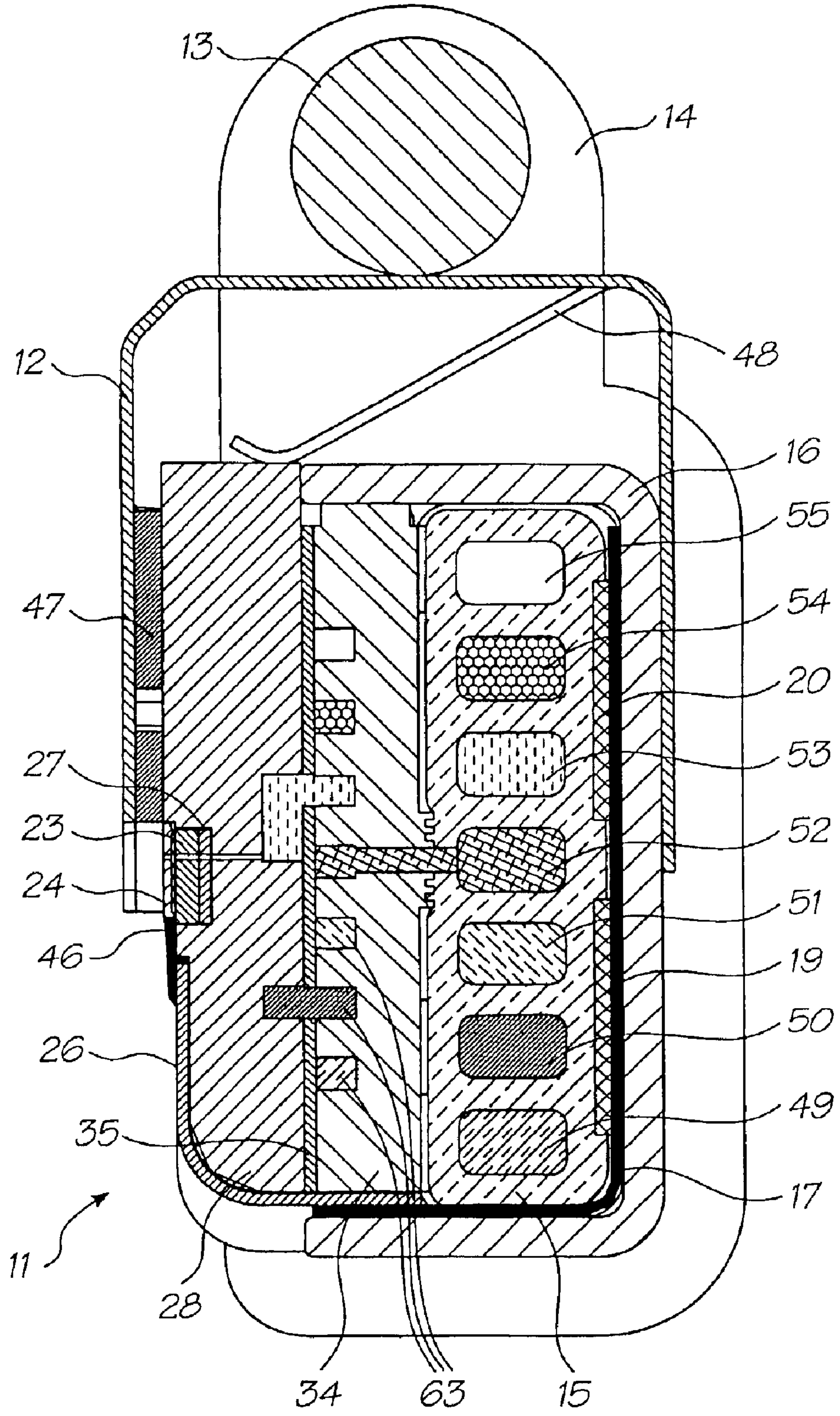
FIG. 9 is a schematic cross-sectional end elevational view of the printhead of FIG. 1.
Figure 10:
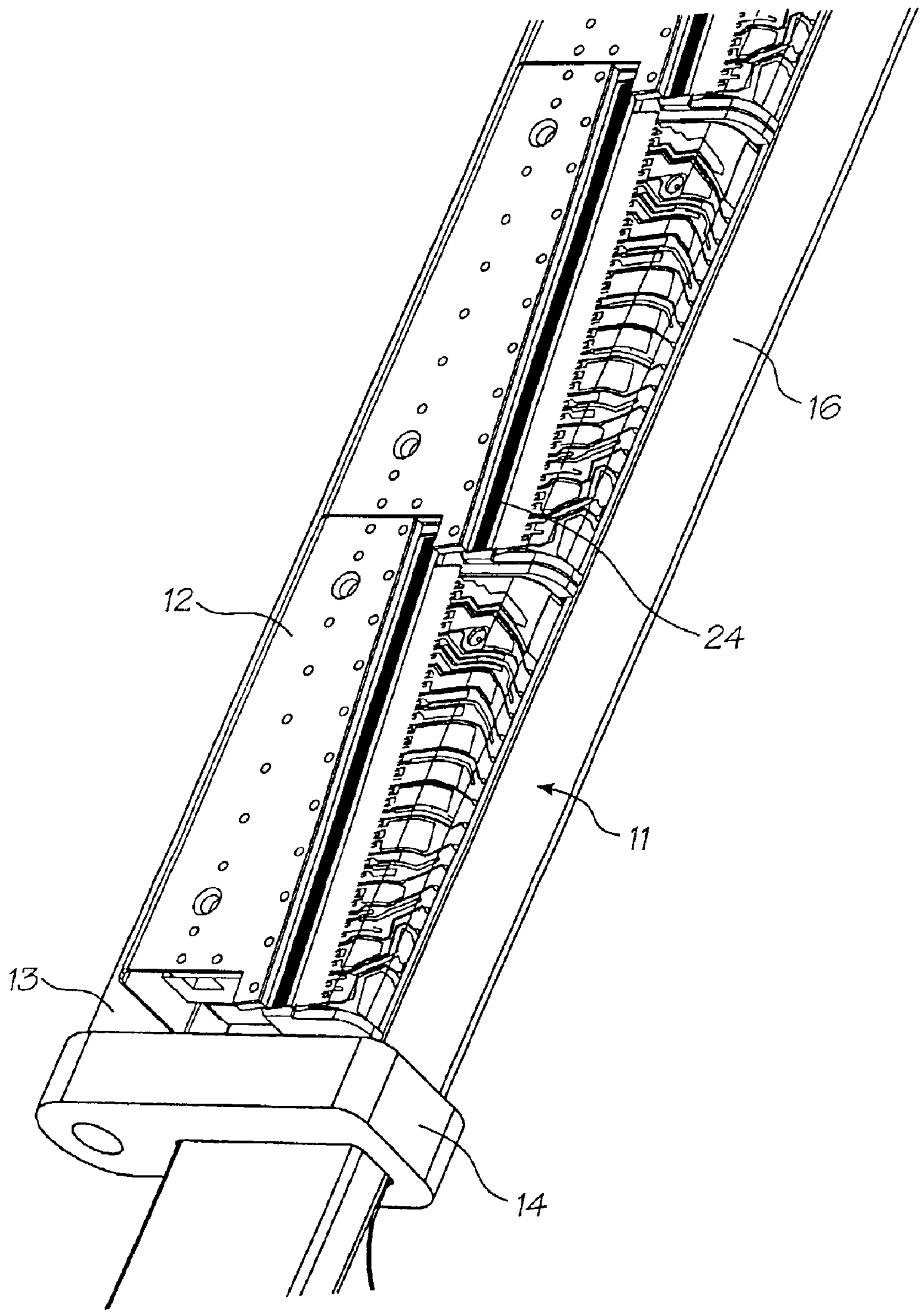
FIG. 10 is a schematic illustration of the printhead of FIG. 1 in an uncapped configuration.

The fine pitch flex PCB 26 wraps down the side of each printhead module 11 and makes contact with the flex PCB 17 (FIG. 9). The flex PCB 17 carries two busbars 19 (positive) and 20 (negative) for powering each module 11, as well as all data connections. The flex PCB 17 is bonded onto the continuous metal "Invar" channel 16. The metal channel 16 serves to hold the modules 11 in place and is designed to have a similar coefficient of thermal expansion to that of silicon used in the modules.

Figure 12B:
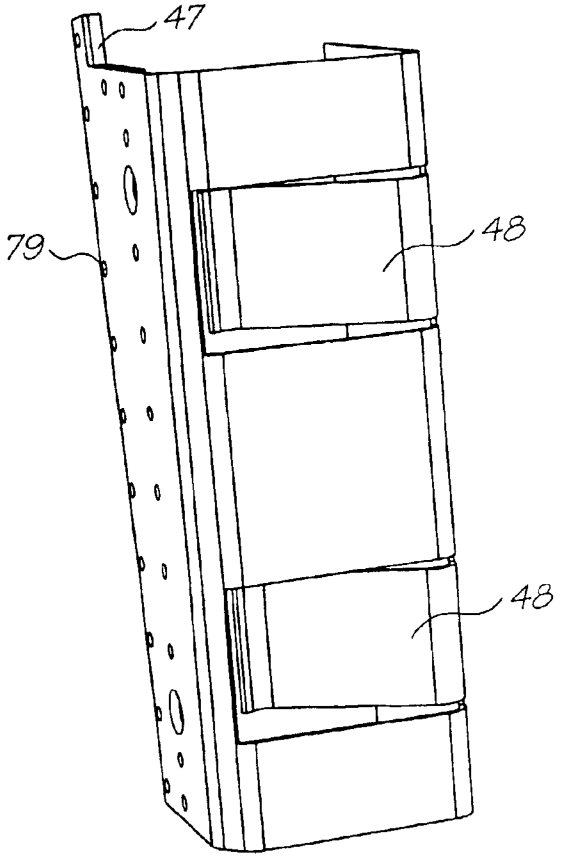
FIG. 12*b* is a schematic illustration of the capping device of FIG. 12*a,* viewed from a different angle.
Figure 12A:
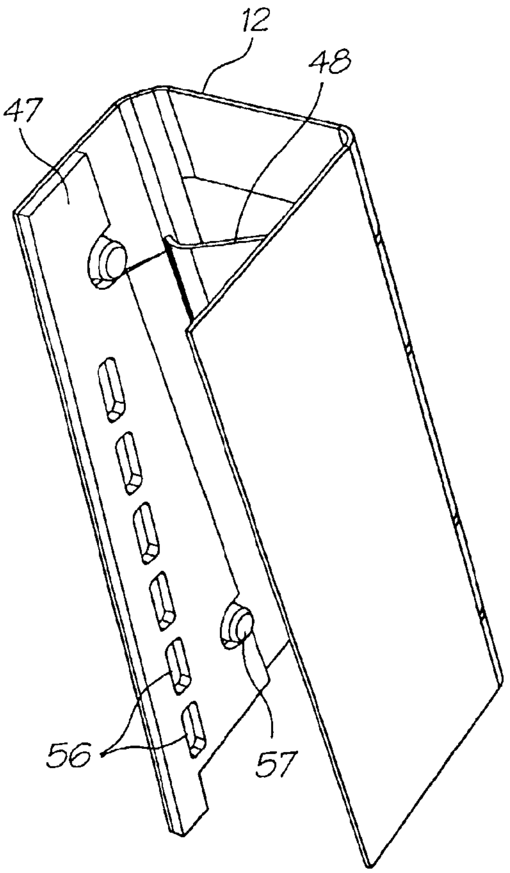
FIG. 12*a* is a schematic illustration of a capping device.

A capping device 12 is used to cover the "Memjet" chips 23 when not in use. The capping device is typically made of spring steel with an onsert molded elastomeric pad 47 (FIG. 12*a*). The pad 47 serves to duct air into the "Memjet" chip 23 when uncapped and cut off air and cover a nozzle guard 24 (FIG. 9) when capped. The capping device 12 is actuated by a camshaft 13 that typically rotates throughout 180°.

The overall thickness of the "Memjet" chip is typically 0.6 mm which includes a 150 micron inlet backing layer 27 and a nozzle guard 24 of 150 micron thickness. These elements are assembled at the wafer scale.

Figure 16:
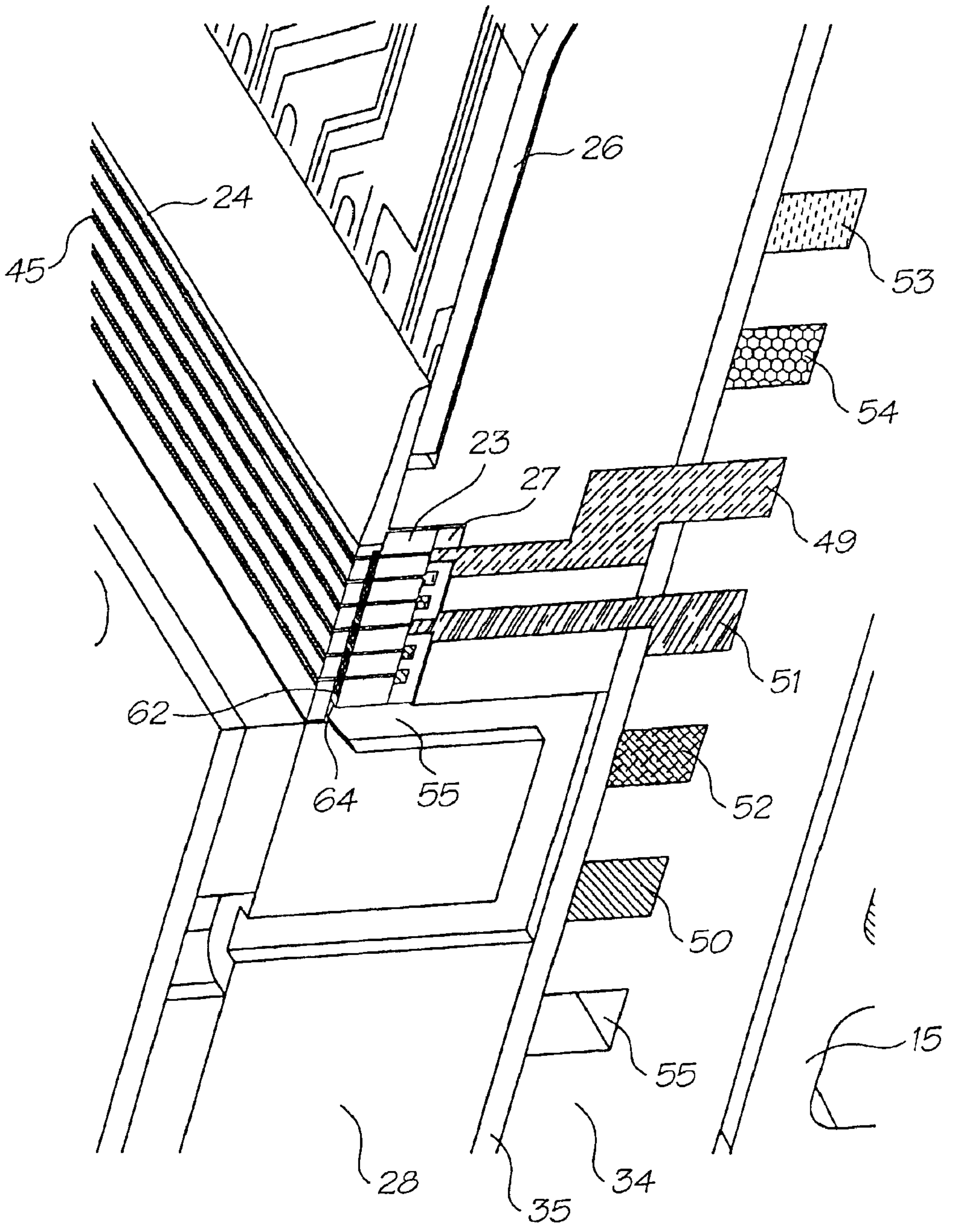
FIG. 16 is a schematic close-up illustration of a portion of the printhead of FIG. 15 showing greater detail in the area of the "Memjet" chip.

The nozzle guard 24 allows filtered air into an 80 micron cavity 64 (FIG. 16) above the "Memjet" ink nozzles 62. The pressurized air flows through micro-droplet holes 45 in the nozzle guard 24 (with the ink during a printing operation) and serves to protect the delicate "Memjet" nozzles 62 by repelling foreign particles.

A silicon chip backing layer 27 ducts ink from the printhead module packaging directly into the rows of "Memjet" nozzles 62. The "Memjet" chip 23 is wire bonded 25 from bond pads on the chip at 116 positions to the fine pitch flex PCB 26. The wire bonds are on a 120 micron pitch and are cut as they are bonded onto the fine pitch flex PCB pads (FIG. 3). The fine pitch flex PCB 26 carries data and power from the flex PCB 17 via a series of gold contact pads 69 along the edge of the flex PCB.

The wire bonding operation between chip and fine pitch flex PCB 26 may be done remotely, before transporting, placing and adhering the chip assembly into the printhead module assembly. Alternatively, the "Memjet" chips 23 can be adhered into the upper micro-molding 28 first and then the fine pitch flex PCB 26 can be adhered into place. The wire bonding operation could then take place in situ, with no danger of distorting the moldings 28 and 34. The upper micro-molding 28 can be made of a Liquid Crystal Polymer (LCP) blend. Since the crystal structure of the upper micro-molding 28 is minute, the heat distortion temperature (180° C.–260° C.), the continuous usage temperature (200° C.–240° C.) and soldering heat durability (260° C. for 10 seconds to 310° C. for 10 seconds) are high, regardless of the relatively low melting point.

Each printhead module 11 includes an upper micro-molding 28 and a lower micro-molding 34 separated by a mid-package film layer 35 shown in FIG. 3.

The mid-package film layer 35 can be an inert polymer such as polyimide, which has good chemical resistance and dimensional stability. The mid-package film layer 35 can have laser ablated holes 65 and can comprise a double-sided adhesive (ie. an adhesive layer on both faces) providing adhesion between the upper micro-molding, the mid-package film layer and the lower micro-molding.

The upper micro-molding 28 has a pair of alignment pins 29 passing through corresponding apertures in the mid-package film layer 35 to be received within corresponding recesses 66 in the lower micro-molding 34. This serves to align the components when they are bonded together. Once bonded together, the upper and lower micro-moldings form a tortuous ink and air path in the complete "Memjet" printhead module 11.

There are annular ink inlets 32 in the underside of the lower micro-molding 34. In a preferred embodiment, there are six such inlets 32 for various inks (black, yellow, magenta, cyan, fixitive and infrared). There is also provided an air inlet slot 67. The air inlet slot 67 extends across the lower micro-molding 34 to a secondary inlet which expels air through an exhaust hole 33, through an aligned hole 68 in fine pitch flex PCB 26. This serves to repel the print media from the printhead during printing. The ink inlets 32 continue in the undersurface of the upper micro-molding 28 as does a path from the air inlet slot 67. The ink inlets lead to 200 micron exit holes also indicated at 32 in FIG. 3. These holes correspond to the inlets on the silicon backing layer 27 of the "Memjet" chip 23.

There is a pair of elastomeric pads 36 on an edge of the lower micro-molding 34. These serve to take up tolerance and positively located the printhead modules 11 into the metal channel 16 when the modules are micro-placed during assembly.

A preferred material for the "Memjet" micro-moldings is a LCP. This has suitable flow characteristics for the fine detail in the moldings and has a relatively low coefficient of thermal expansion.

Robot picker details are included in the upper micro-molding 28 to enable accurate placement of the printhead modules 11 during assembly.

The upper surface of the upper micro-molding 28 as shown in FIG. 3 has a series of alternating air inlets and outlets 31. These act in conjunction with the capping device 12 and are either sealed off or grouped into air inlet/outlet chambers, depending upon the position of the capping device 12. They connect air diverted from the inlet slot 67 to the chip 23 depending upon whether the unit is capped or uncapped.

A capper cam detail 40 including a ramp for the capping device is shown at two locations in the upper surface of the upper micro-molding 28. This facilitates a desirable movement of the capping device 12 to cap or uncap the chip and the air chambers. That is, as the capping device is caused to move laterally across the print chip during a capping or uncapping operation, the ramp of the capper cam detail 40 serves to elastically distort and capping device as it is moved by operation of the camshaft 13 so as to prevent scraping of the device against the nozzle guard 24.

Figure 4:
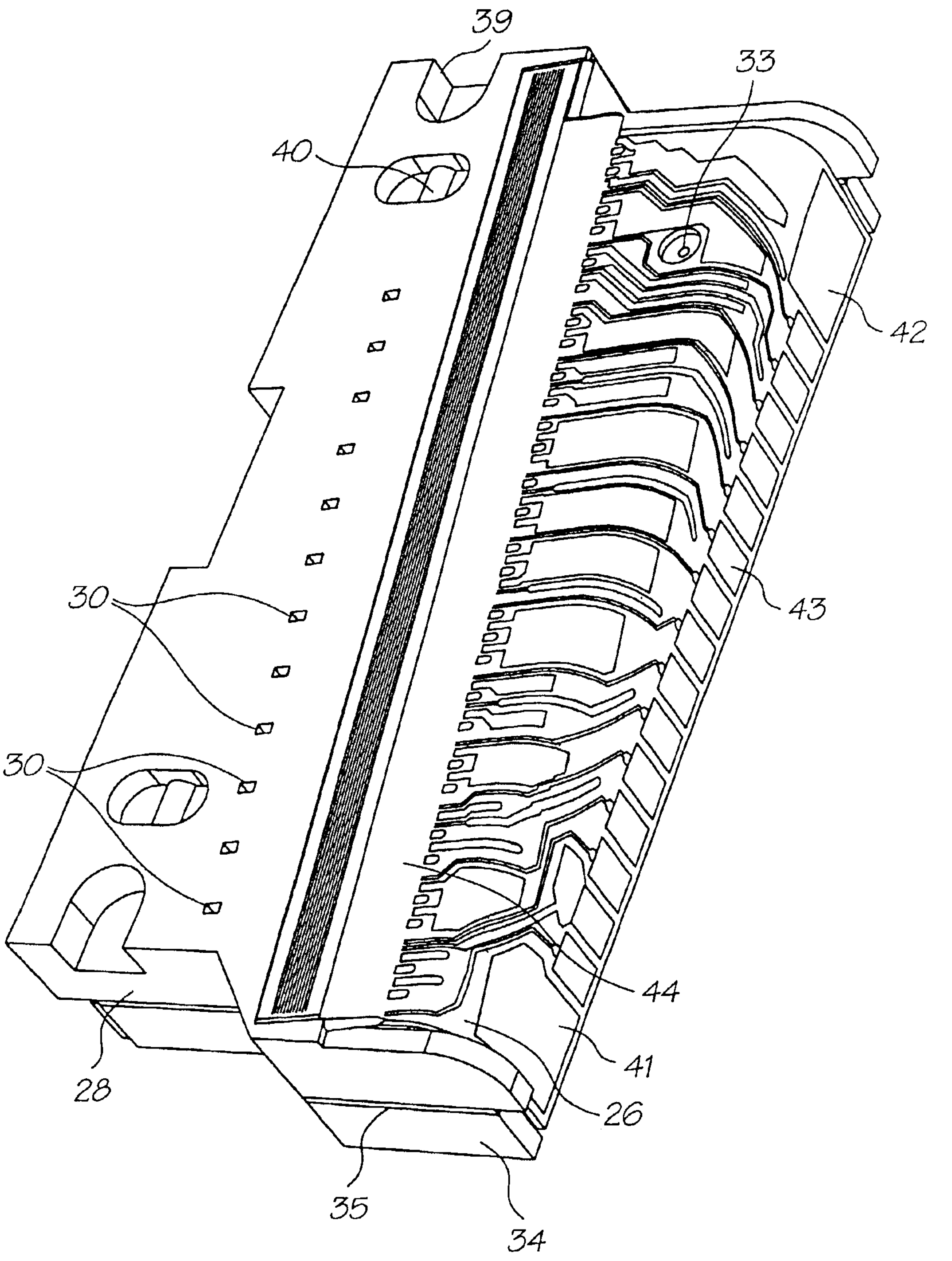
FIG. 4 is a schematic illustration of an assembled ink jet module.
Figure 5:
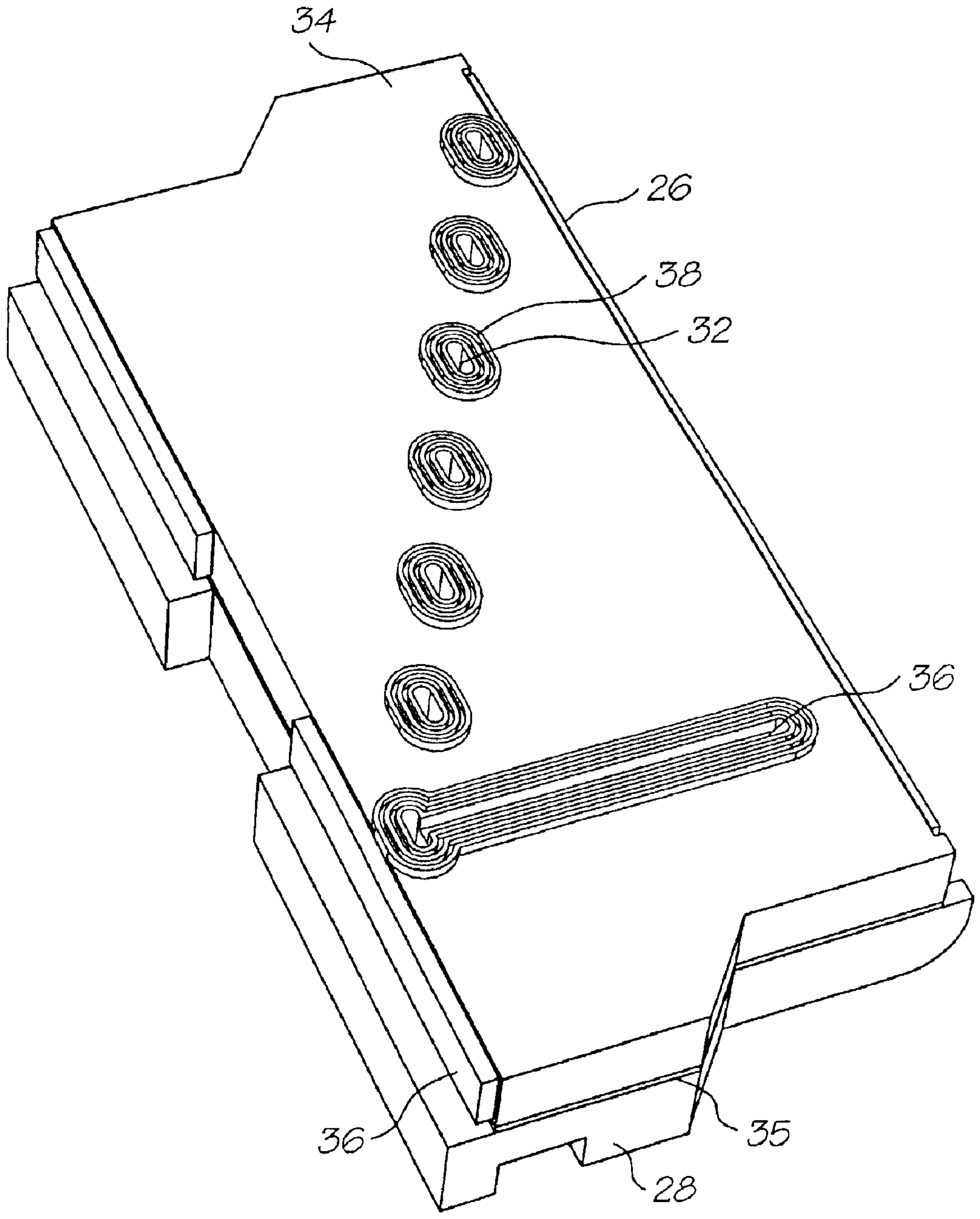
FIG. 5 is a schematic inverted illustration of the module of FIG. 4.
Figure 6:
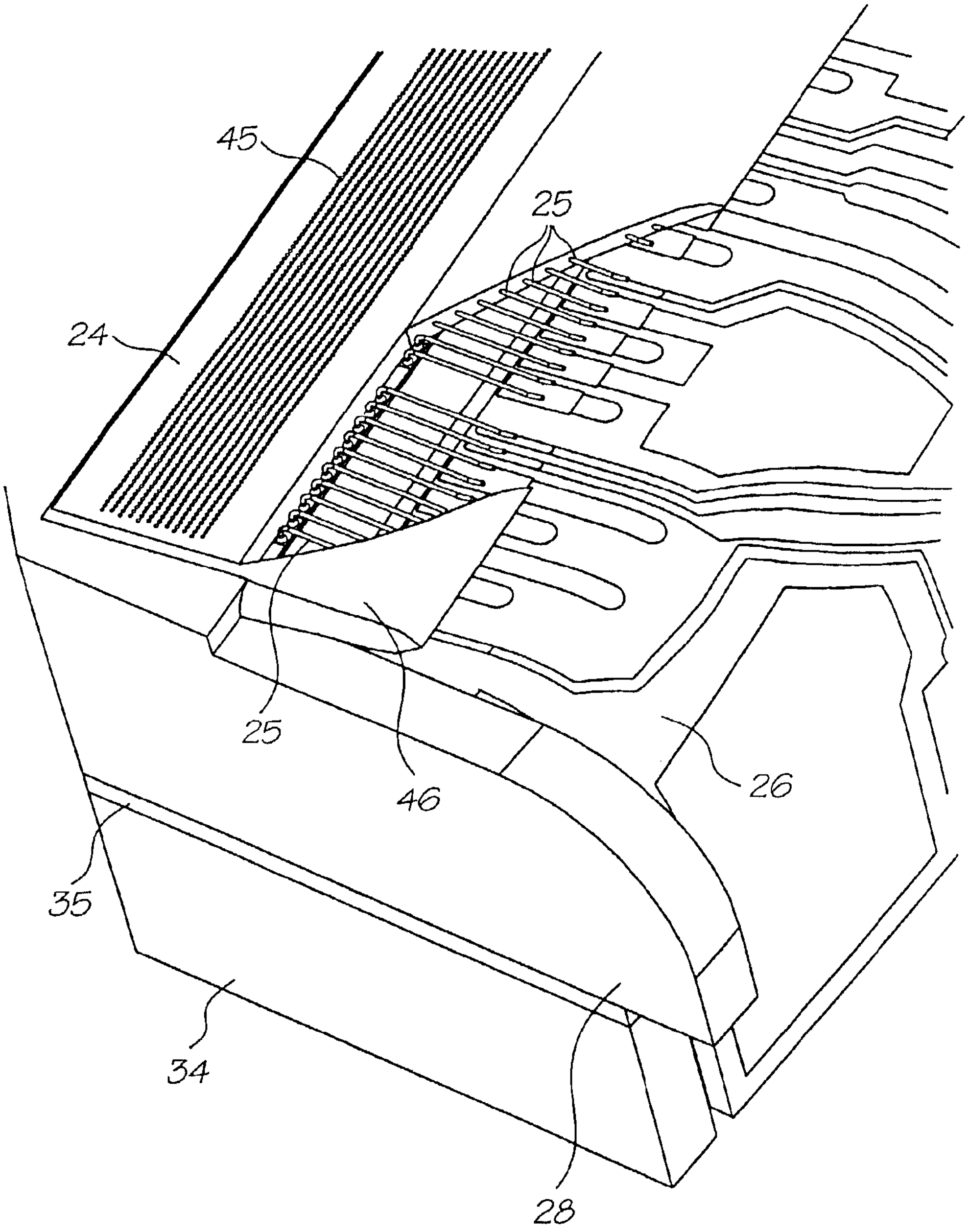
FIG. 6 is a schematic close-up illustration of the module of FIG. 4.
Figure 7:
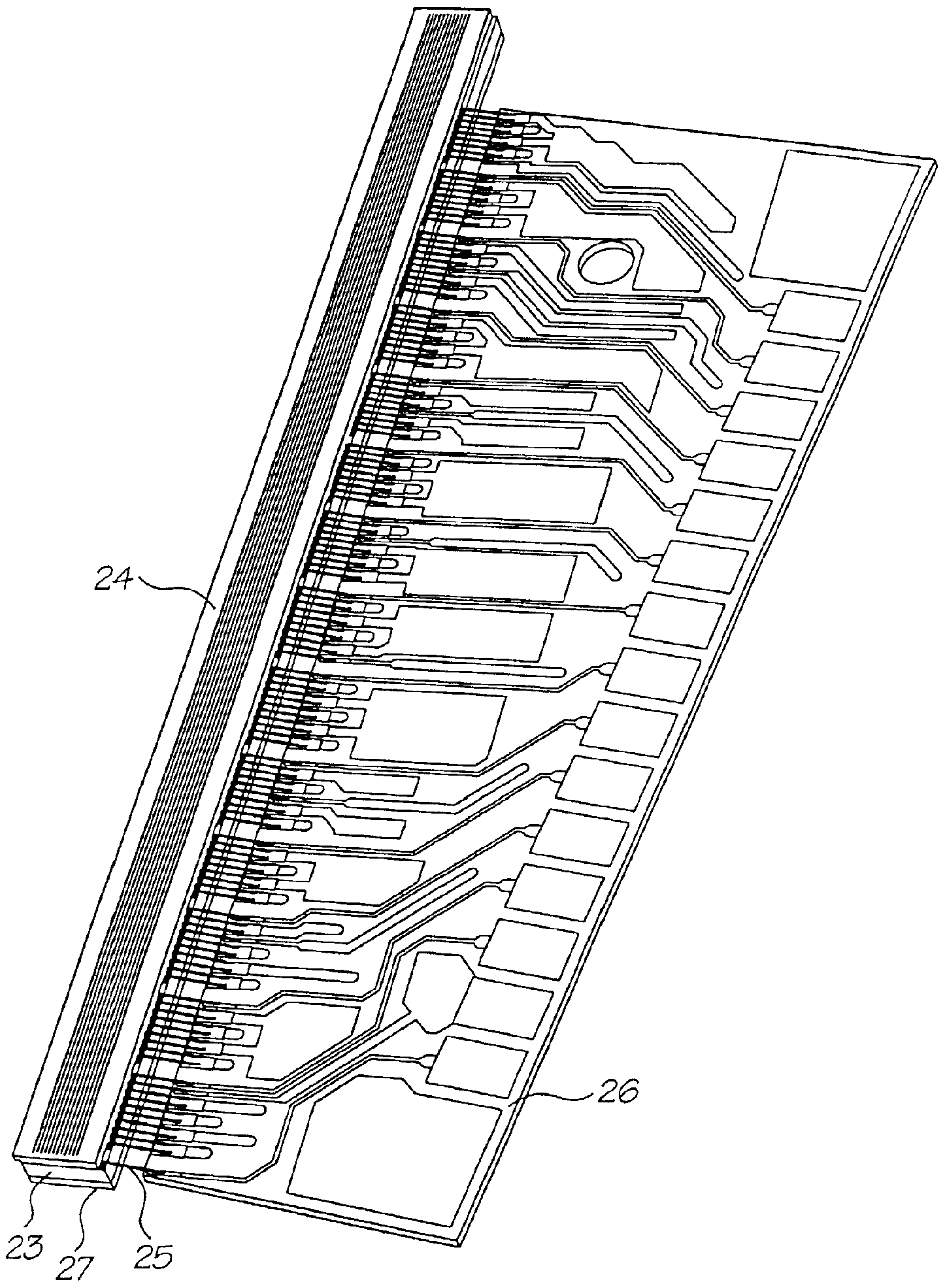
FIG. 7 is a schematic illustration of a chip sub-assembly.
Figure 8A:
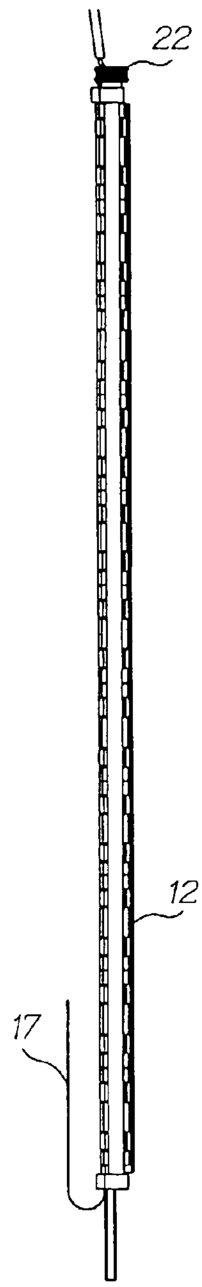
FIG. 8*a* is a schematic side elevational view of the printhead of FIG. 1.
Figure 8B:
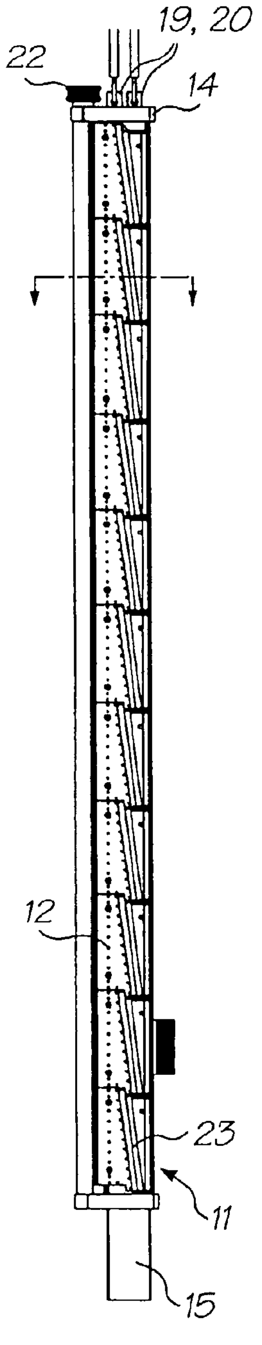
FIG. 8*b* is a schematic plan view of the printhead of FIG. 8*a;*
Figure 8C:
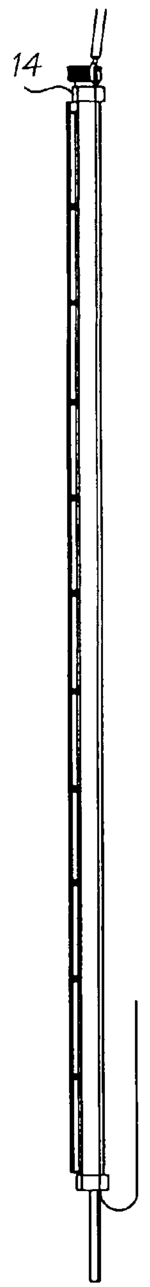
FIG. 8*c* is a schematic side view (other side) of the printhead of FIG. 8*a;*
Figure 8D:
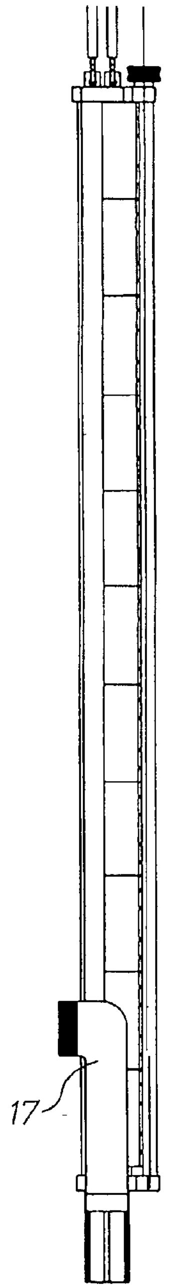
FIG. 8*d* is a schematic inverted plan view of the printhead of FIG. 8*b;*

The "Memjet" chip assembly 23 is picked and bonded into the upper micro-molding 28 on the printhead module 11. The fine pitch flex PCB 26 is bonded and wrapped around the side of the assembled printhead module 11 as shown in FIG. 4. After this initial bonding operation, the chip 23 has more sealant or adhesive 46 applied to its long edges. This serves to "pot" the bond wires 25 (FIG. 6), seal the "Memjet" chip 23 to the molding 28 and form a sealed gallery into which filtered air can flow and exhaust through the nozzle guard 24.

The flex PCB 17 carries all data and power connections from the main PCB (not shown) to each "Memjet" printhead module 11. The flex PCB 17 has a series of gold plated, domed contacts 69 (FIG. 2) which interface with contact pads 41, 42 and 43 on the fine pitch flex PCB 26 of each "Memjet" printhead module 11.

Two copper busbar strips 19 and 20, typically of 200 micron thickness, are jigged and soldered into place on the flex PCB 17. The busbars 19 and 20 connect to a flex termination which also carries data.

The flex PCB 17 is approximately 340 mm in length and is formed from a 14 mm wide strip. It is bonded into the metal channel 16 during assembly and exits from one end of the printhead assembly only.

The metal U-channel 16 into which the main components are place is of a special alloy called "Invar 36". It is a 36% nickel iron alloy possessing a coefficient of thermal expansion of $1/10^{th}$ that of carbon steel at temperatures up to 400° F. The Invar is annealed for optimal dimensional stability.

Additionally, the Invar is nickel plated to a 0.056% thickness of the wall section. This helps to further match it to the coefficient of thermal expansion of silicon which is $2\times10^{-6}$ per ° C.

The Invar channel 16 functions to capture the "Memjet" printhead modules 11 in a precise alignment relative to each other and to impart enough force on the modules 11 so as to form a seal between the ink inlets 32 on each printhead module and the outlet holes 21 that are laser ablated into the elastomeric ink delivery extrusion 15.

Figure 17:
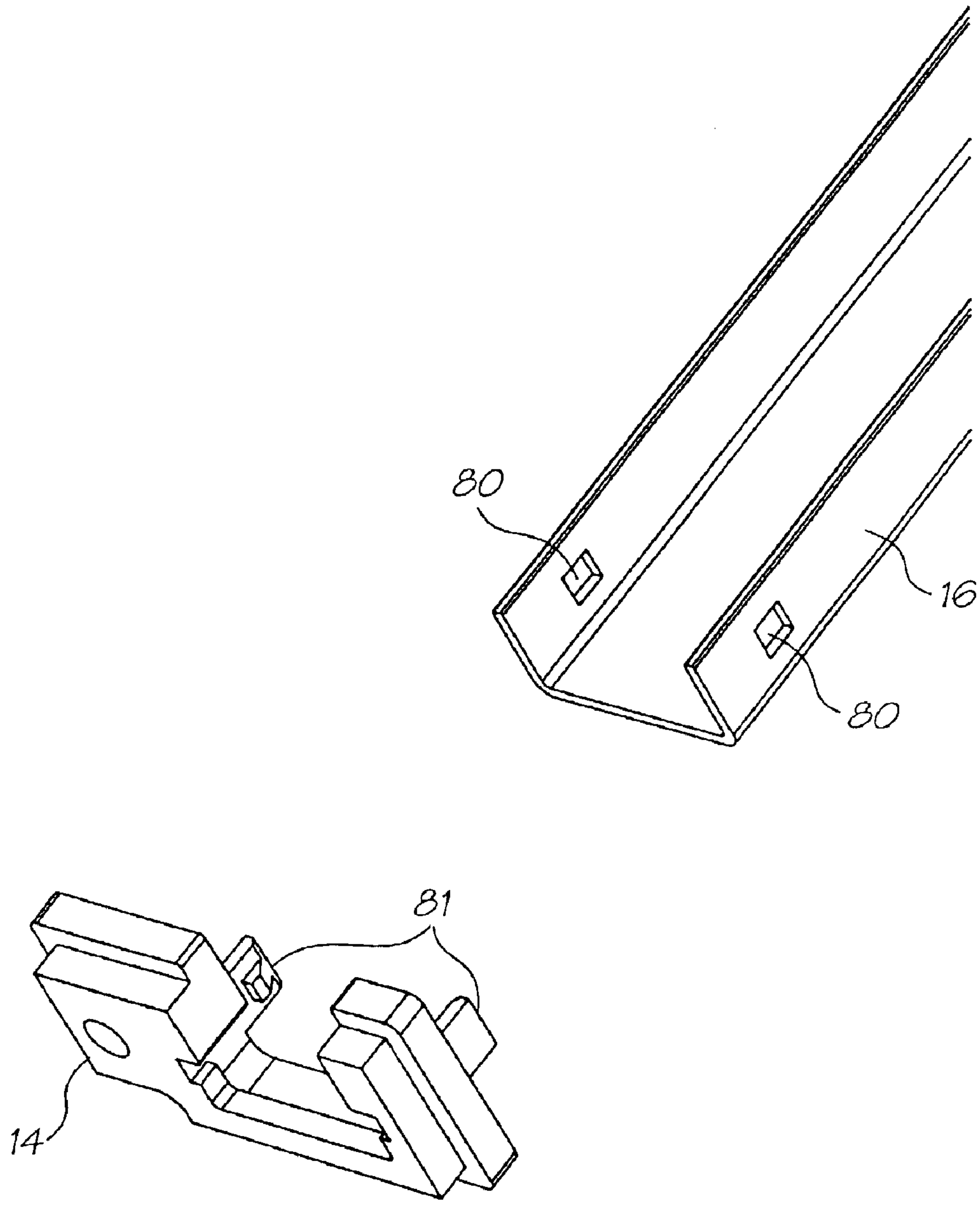
FIG. 17 is a schematic illustration of the end portion of a metal channel and a printhead location molding.

The similar coefficient of thermal expansion of the Invar channel to the silicon chips allows similar relative movement during temperature changes. The elastomeric pads 36 on one side of each printhead module 11 serve to "lubricate" them within the channel 16 to take up any further lateral coefficient of thermal expansion tolerances without losing alignment. The Invar channel is a cold rolled, annealed and nickel plated strip. Apart from two bends that are required in its formation, the channel has two square cutouts 80 at each end. These mate with snap fittings 81 on the printhead location moldings 14 (FIG. 17).

Figure 18A:
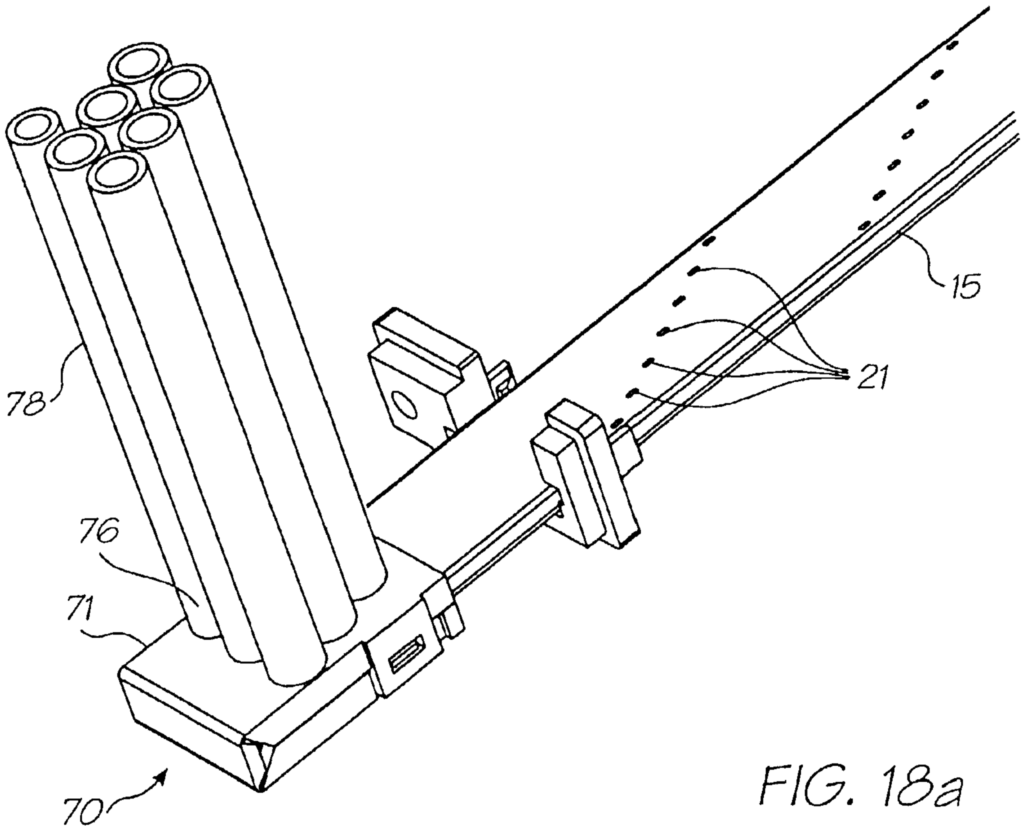
FIG. 18*a* is a schematic illustration of an end portion of an elastomeric ink delivery extrusion and a molded end cap.
Figure 18B:
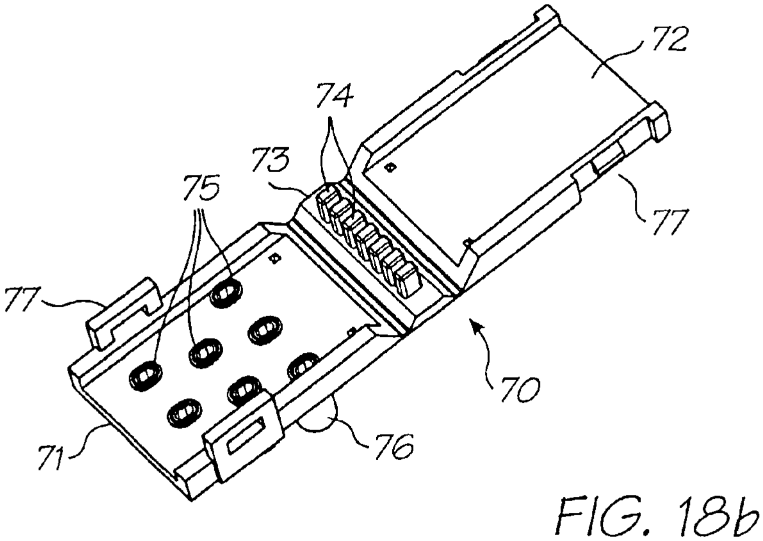
FIG. 18*b* is a schematic illustration of the end cap of FIG. 18*a* in an out-folded configuration.

The elastomeric ink delivery extrusion 15 is a non-hydrophobic, precision component. Its function is to transport ink and air to the "Memjet" printhead modules 11. The extrusion is bonded onto the top of the flex PCB 17 during assembly and it has two types of molded end caps. One of these end caps is shown at 70 in FIG. 18*a*.

A series of patterned holes 21 are present on the upper surface of the extrusion 15. These are laser ablated into the upper surface. To this end, a mask is made and placed on the surface of the extrusion, which then has focused laser light applied to it. The holes 21 are evaporated from the upper surface, but the laser does not cut into the lower surface of extrusion 15 due to the focal length of the laser light.

Eleven repeated patterns of the laser ablated holes 21 form the ink and air outlets 21 of the extrusion 15. These interface with the annular ring inlets 32 on the underside of the "Memjet" printhead module lower micro-molding 34. A different pattern of larger holes (not shown but concealed beneath the upper plate 71 of end cap 70 in FIG. 18*a*) is ablated into one end of the extrusion 15. These mate with apertures 75 having annular ribs formed in the same way as those on the underside of each lower micro-molding 34 described earlier. Ink and air delivery hoses 78 are connected to respective connectors 76 that extend from the upper plate 71. Due to the inherent flexibility of the extrusion 15, it can contort into many ink connection mounting configurations without restricting ink and air flow. The molded end cap 70 has a spine 73 from which the upper and lower plates are integrally hinged. The spine 73 includes a row of plugs 74 that are received within the ends of the respective flow passages of the extrusion 15.

The other end of the extrusion 15 is capped with simple plugs which block the channels in a similar way as the plugs 74 on spine 17.

The end cap 70 clamps onto the ink extrusion 15 by way of snap engagement tabs 77. Once assembled with the delivery hoses 78, ink and air can be received from ink reservoirs and an air pump, possibly with filtration means. The end cap 70 can be connected to either end of the extrusion, ie. at either end of the printhead.

The plugs 74 are pushed into the channels of the extrusion 15 and the plates 71 and 72 are folded over. The snap engagement tabs 77 clamp the molding and prevent it from slipping off the extrusion. As the plates are snapped together, they form a sealed collar arrangement around the end of the extrusion. Instead of providing individual hoses 78 pushed onto the connectors 76, the molding 70 might interface directly with an ink cartridge. A sealing pin arrangement can also be applied to this molding 70. For example, a perforated, hollow metal pin with an elastomeric collar can be fitted to the top of the inlet connectors 76. This would allow the inlets to automatically seal with an ink cartridge when the cartridge is inserted. The air inlet and hose might be smaller than the other inlets in order to avoid accidental charging of the airways with ink.

Figure 13:
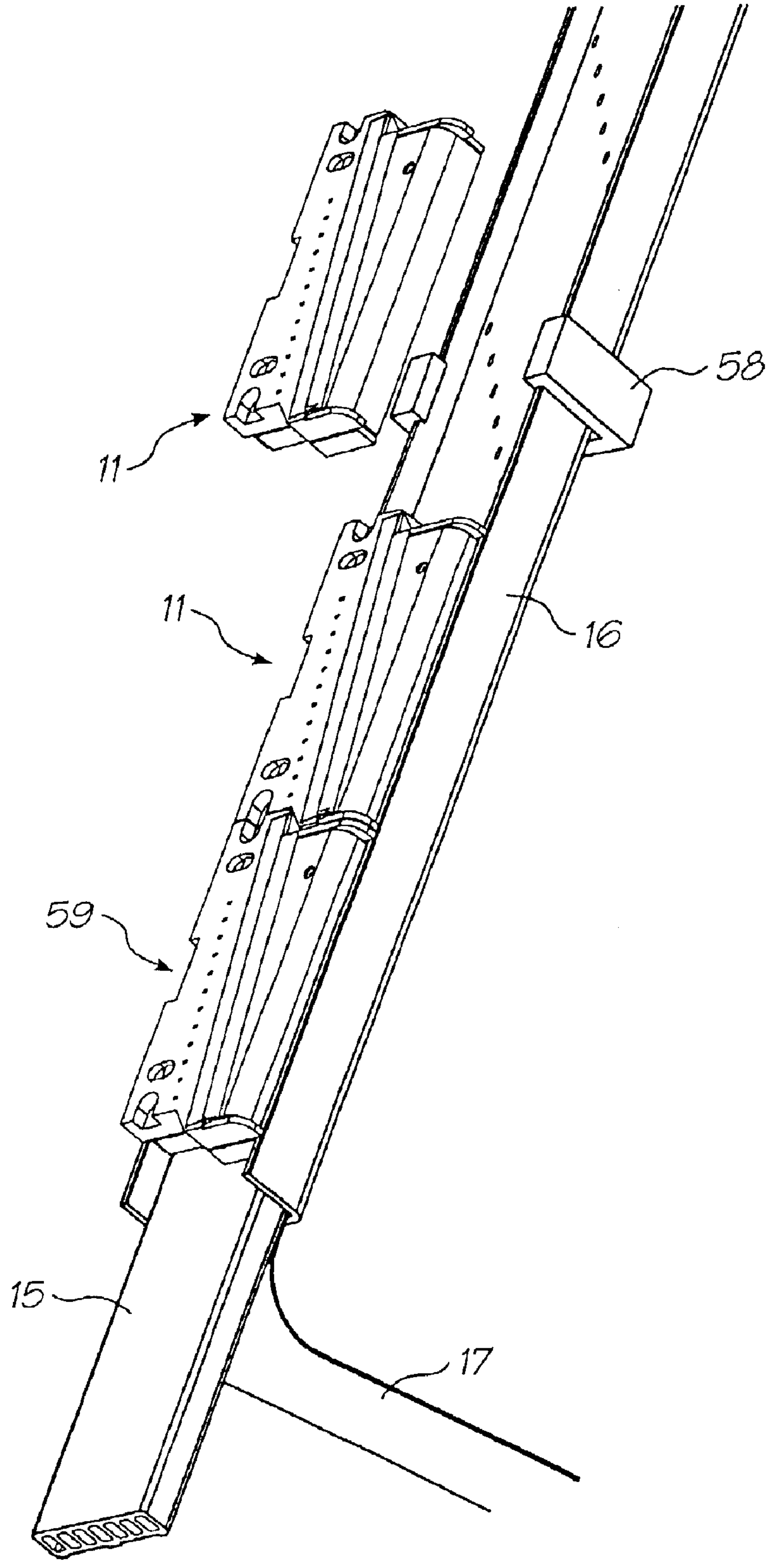
FIG. 13 is a schematic illustration showing the loading of an ink jet module into a printhead.

The capping device 12 for the "Memjet" printhead would typically be formed of stainless spring steel. An elastomeric seal or onsert molding 47 is attached to the capping device as shown in FIGS. 12*a* and 12*b*. The metal part from which the capping device is made is punched as a blank and then inserted into an injection molding tool ready for the elastomeric onsert to be shot onto its underside. Small holes 79 (FIG. 13*b*) are present on the upper surface of the metal capping device 12 and can be formed as burst holes. They serve to key the onsert molding 47 to the metal. After the molding 47 is applied, the blank is inserted into a press tool, where additional bending operations and forming of integral springs 48 takes place.

Figure 11:
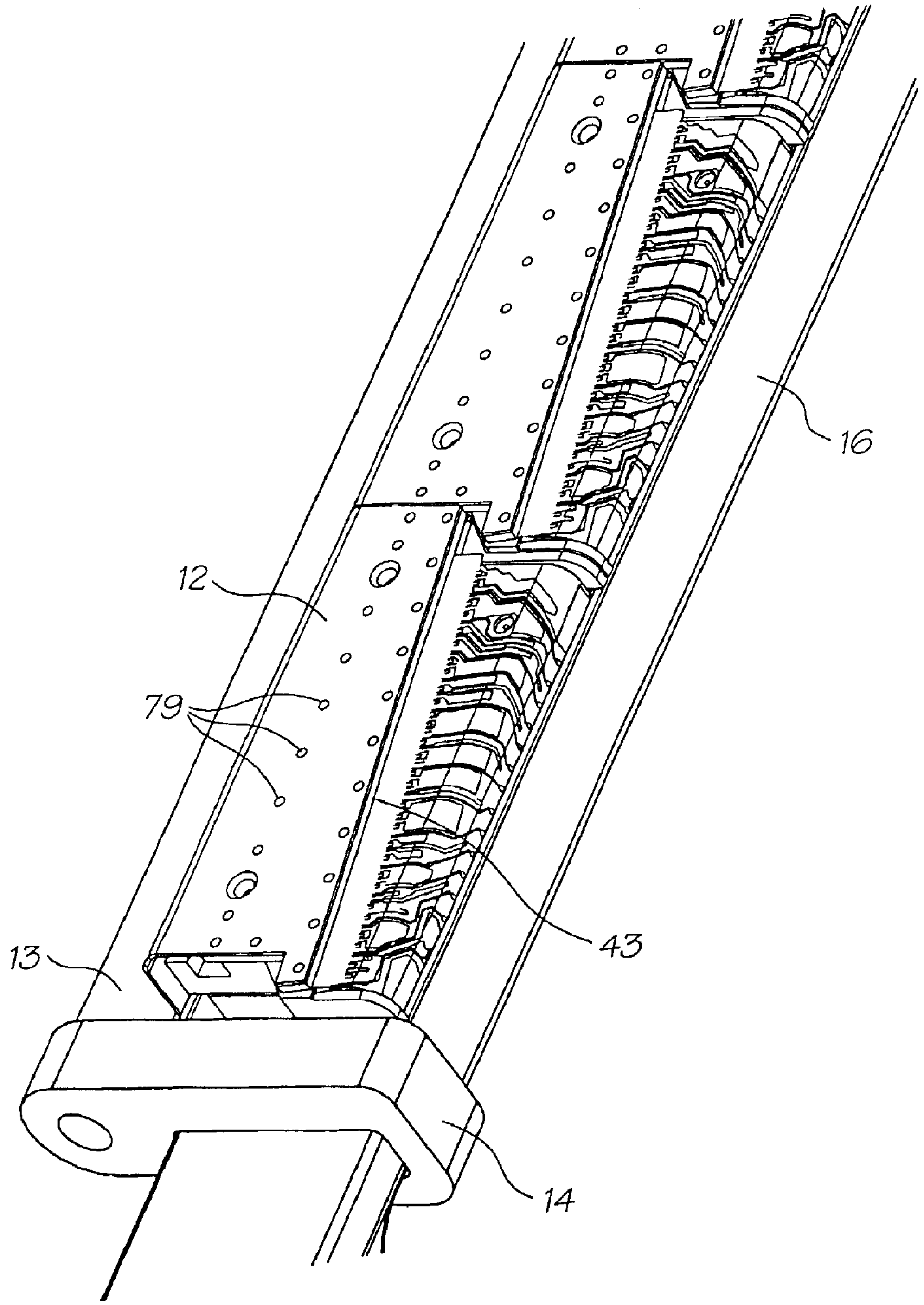
FIG. 11 is a schematic illustration of the printhead of FIG. 10 in a capped configuration.

The elastomeric onsert molding 47 has a series of rectangular recesses or air chambers 56. These create chambers when uncapped. The chambers 56 are positioned over the air inlet and exhaust holes 30 of the upper micro-molding 28 in the "Memjet" printhead module 11. These allow the air to flow from one inlet to the next outlet. When the capping device 12 is moved forward to the "home" capped position as depicted in FIG. 11, these airways 32 are sealed off with a blank section of the onsert molding 47 cutting off airflow to the "Memjet" chip 23. This prevents the filtered air from drying out and therefore blocking the delicate "Memjet" nozzles.

Another function of the onsert molding 47 is to cover and clamp against the nozzle guard 24 on the "Memjet" chip 23. This protects against drying out, but primarily keeps foreign particles such as paper dust from entering the chip and damaging the nozzles. The chip is only exposed during a printing operation, when filtered air is also exiting along with the ink drops through the nozzle guard 24. This positive air pressure repels foreign particles during the printing process and the capping device protects the chip in times of inactivity.

The integral springs 48 bias the capping device 12 away from the side of the metal channel 16. The capping device 12 applies a compressive force to the top of the printhead module 11 and the underside of the metal channel 16. The lateral capping motion of the capping device 12 is governed by an eccentric camshaft 13 mounted against the side of the capping device. It pushes the device 12 against the metal channel 16. During this movement, the bosses 57 beneath the upper surface of the capping device 12 ride over the respective ramps 40 formed in the upper micro-molding 28. This action flexes the capping device and raises its top surface to raise the onsert molding 47 as it is moved laterally into position onto the top of the nozzle guard 24.

The camshaft 13, which is reversible, is held in position by two printhead location moldings 14. The camshaft 11 can have a flat surface built in one end or be otherwise provided with a spline or keyway to accept gear 22 or another type of motion controller.

The "Memjet" chip and printhead module are assembled as follows:

1. The "Memjet" chip 23 is dry tested in flight by a pick and place robot, which also dices the wafer and transports individual chips to a fine pitch flex PCB bonding area.
2. When accepted, the "Memjet" chip 23 is placed 530 microns apart from the fine pitch flex PCB 26 and has wire bonds 25 applied between the bond pads on the chip and the conductive pads on the fine pitch flex PCB. This constitutes the "Memjet" chip assembly.
3. An alternative to step 2 is to apply adhesive to the internal walls of the chip cavity in the upper micro-molding 28 of the printhead module and bond the chip into place first. The fine pitch flex PCB 26 can then be applied to the upper surface of the micro-molding and wrapped over the side. Wire bonds 25 are then applied between the bond pads on the chip and the fine pitch flex PCB.
4. The "Memjet" chip assembly is vacuum transported to a bonding area where the printhead modules are stored.
5. Adhesive is applied to the lower internal walls of the chip cavity and to the area where the fine pitch flex PCB is going to be located in the upper micro-molding of the printhead module.
6. The chip assembly (and fine pitch flex PCB) are bonded into place. The fine pitch flex PCB is carefully wrapped around the side of the upper micro-molding so as not to strain the wire bonds. This may be considered as a two step gluing operation if it is deemed that the fine pitch flex PCB might stress the wire bonds. A line of adhesive running parallel to the chip can be applied at the same time as the internal chip cavity walls are coated. This allows the chip assembly and fine pitch flex PCB to be seated into the chip cavity and the fine pitch flex PCB allowed to bond to the micro-molding without additional stress. After curing, a secondary gluing operation could apply adhesive to the short side wall of the upper micro-molding in the fine pitch flex PCB area. This allows the fine pitch flex PCB to be wrapped around the micro-molding and secured, while still being firmly bonded in place along on the top edge under the wire bonds.
7. In the final bonding operation, the upper part of the nozzle guard is adhered to the upper micro-molding, forming a sealed air chamber. Adhesive is also applied to the opposite long edge of the "Memjet" chip, where the bond wires become 'potted' during the process.
8. The modules are 'wet' tested with pure water to ensure reliable performance and then dried out.
9. The modules are transported to a clean storage area, prior to inclusion into a printhead assembly, or packaged as individual units. The completes the assembly of the "Memjet" printhead module assembly.

10. The metal Invar channel 16 is picked and placed in a jig.
11. The flex PCB 17 is picked and primed with adhesive on the busbar side, positioned and bonded into place on the floor and one side of the metal channel.
12. The flexible ink extrusion 15 is picked and has adhesive applied to the underside. It is then positioned and bonded into place on top of the flex PCB 17. One of the printhead location end caps is also fitted to the extrusion exit end. This constitutes the channel assembly.

The laser ablation process is as follows:

13. The channel assembly is transported to an eximir laser ablation area.
14. The assembly is put into a jig, the extrusion positioned, masked and laser ablated. This forms the ink holes in the upper surface.
15. The ink extrusion 15 has the ink and air connector molding 70 applied. Pressurized air or pure water is flushed through the extrusion to clear any debris.
16. The end cap molding 70 is applied to the extrusion 15. It is then dried with hot air.
17. The channel assembly is transported to the printhead module area for immediate module assembly. Alternatively, a thin film can be applied over the ablated holes and the channel assembly can be stored until required.

Figure 14:
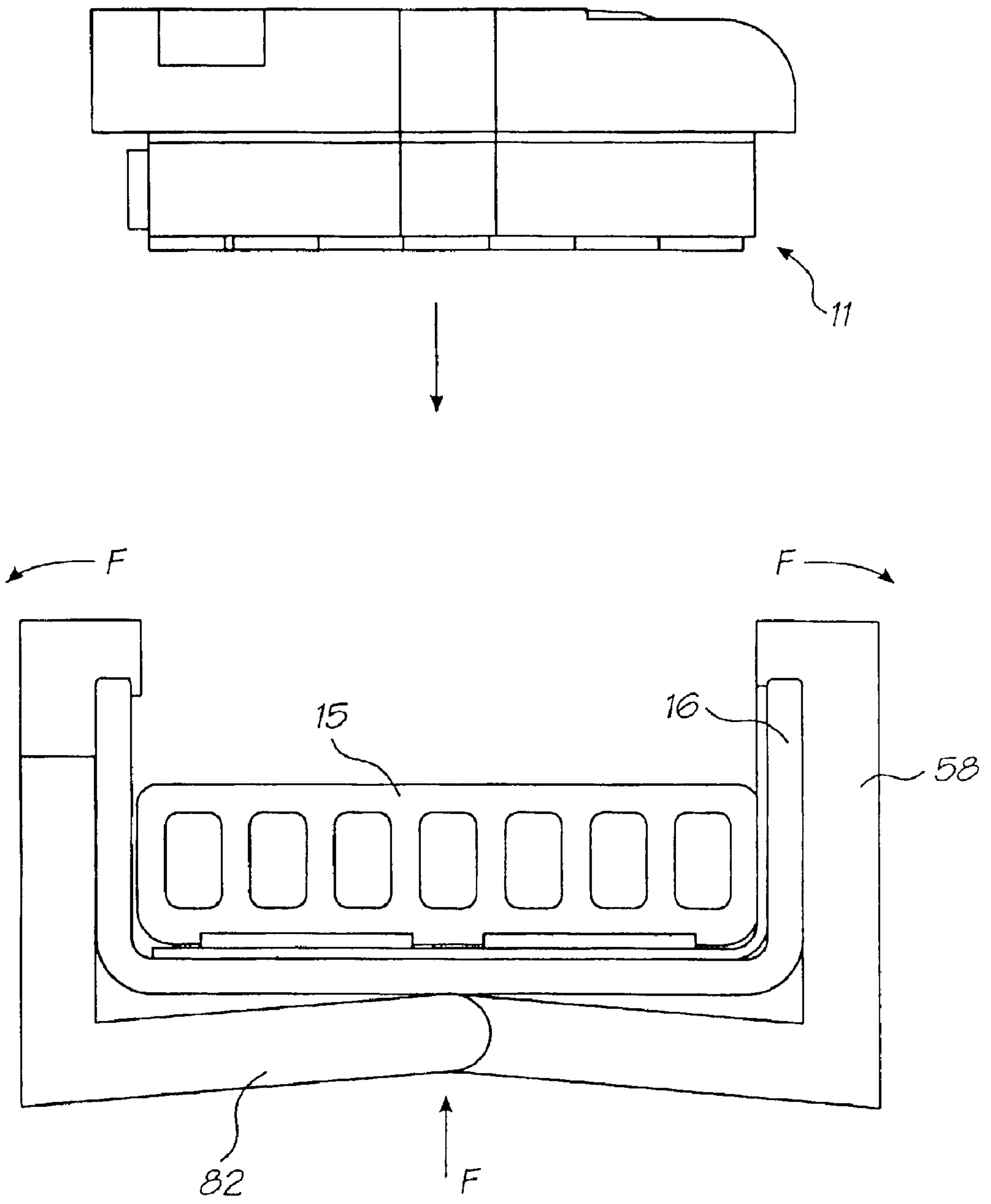
FIG. 14 is a schematic end elevational view of the printhead illustrating the printhead module loading method.
Figure 15:
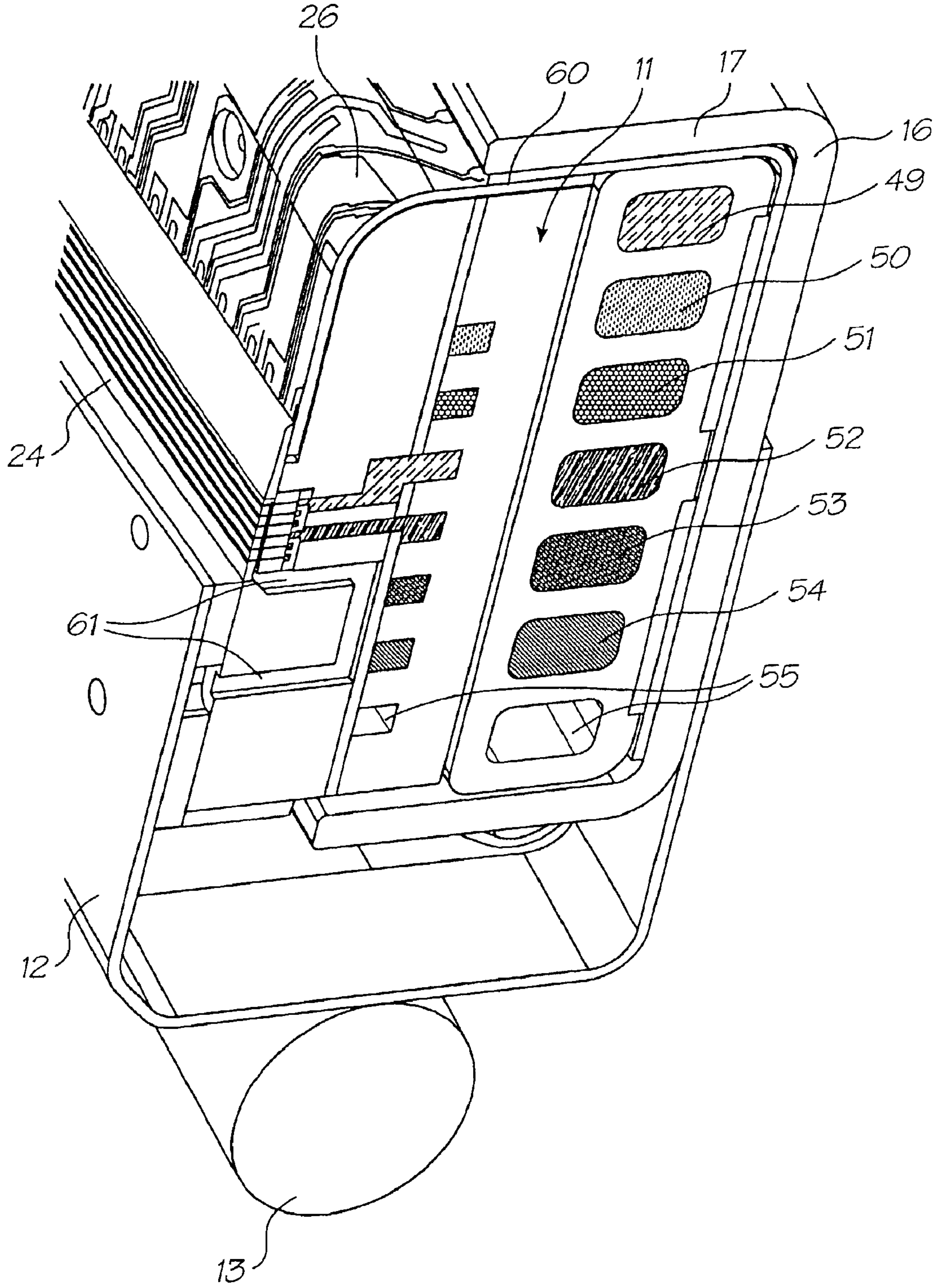
FIG. 15 is a schematic cut-away illustration of the printhead assembly of FIG. 1.

The printhead module to channel is assembled as follows:

18. The channel assembly is picked, placed and clamped into place in a transverse stage in the printhead assembly area.
19. As shown in FIG. 14, a robot tool 58 grips the sides of the metal channel and pivots at pivot point against the underside face to effectively flex the channel apart by 200 to 300 microns. The forces applied are shown generally as force vectors F in FIG. 14. This allows the first "Memjet" printhead module to be robot picked and placed (relative to the first contact pads on the flex PCB 17 and ink extrusion holes) into the channel assembly.
20. The tool 58 is relaxed, the printhead module captured by the resilience of the Invar channel and the transverse stage moves the assembly forward by 19.81 mm.
21. The tool 58 grips the sides of the channel again and flexes it apart ready for the next printhead module.
22. A second printhead module 11 is picked and placed into the channel 50 microns from the previous module.
23. An adjustment actuator arm locates the end of the second printhead module. The arm is guided by the optical alignment of fiducials on each strip. As the adjustment arm pushes the printhead module over, the gap between the fiducials is closed until they reach an exact pitch of 19.812 mm.
24. The tool 58 is relaxed and the adjustment arm is removed, securing the second printhead module in place.
25. This process is repeated until the channel assembly has been fully loaded with printhead modules. The unit is removed from the transverse stage and transported to the capping assembly area. Alternatively, a thin film can be applied over the nozzle guards of the printhead modules to act as a cap and the unit can be stored as required.

The capping device is assembled as follows:

26. The printhead assembly is transported to a capping area. The capping device 12 is picked, flexed apart slightly and pushed over the first module 11 and the metal channel 16 in the printhead assembly. It automatically seats itself into the assembly by virtue of the bosses 57 in the steel locating in the recesses 83 in the upper micro-molding in which a respective ramp 40 is located.
27. Subsequent capping devices are applied to all the printhead modules.
28. When completed, the camshaft 13 is seated into the printhead location molding 14 of the assembly. It has the second printhead location molding seated onto the free end and this molding is snapped over the end of the metal channel, holding the camshaft and capping devices captive.
29. A molded gear 22 or other motion control device can be added to either end of the camshaft 13 at this point.
30. The capping assembly is mechanically tested.

Print charging is as follows:

31. The printhead assembly 10 is moved to the testing area. Inks are applied through the "Memjet" modular printhead under pressure. Air is expelled through the "Memjet" nozzles during priming. When charged, the printhead can be electrically connected and tested.
32. Electrical connections are made and tested as follows:
33. Power and data connections are made to the PCB. Final testing can commence, and when passed, the "Memjet" modular printhead is capped and has a plastic sealing film applied over the underside that protects the printhead until product installation.

I claim:

1. A method of assembling a printhead assembly for a pagewidth drop on demand ink jet printer, the method comprising the steps of:

(a) providing a channel to extend substantially across said pagewidth, the channel having a pair of opposed sidewalls and a base from which the sidewalls extend, (b) applying a force to flex the sidewalls of the channel apart at a location along the channel where a printhead module is to be installed into the channel, (c) placing a printhead module into the channel at said location, (d) releasing the force such that the printhead module is retained by the walls of the channel, (e) repeating steps (b) to (d) at consecutive locations spaced along the channel until all modules of the assembly have been installed in the channel.

* * * * *